Patented Sept. 8, 1942

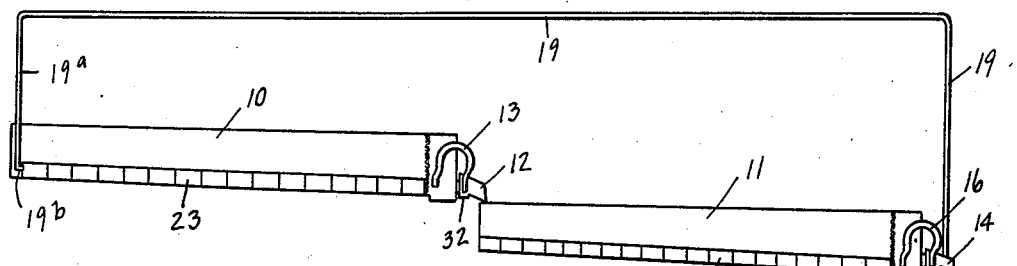
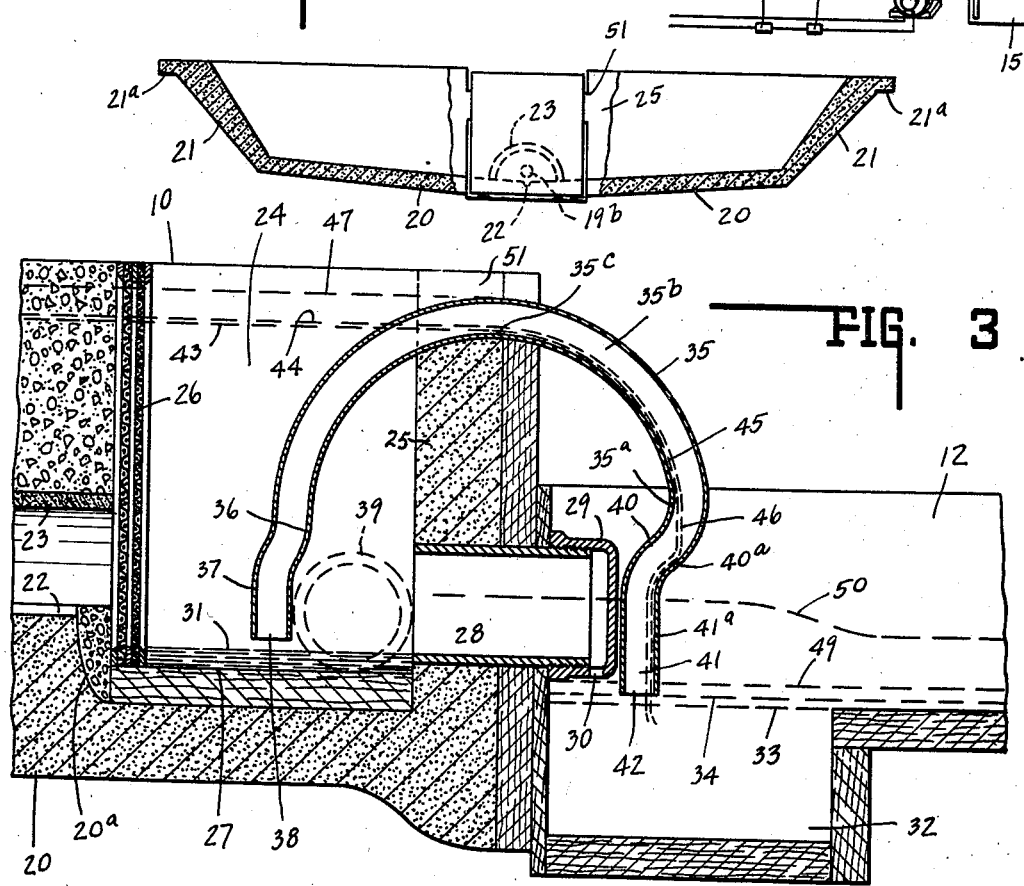

2,295,004

UNITED STATES PATENT OFFICE 2,295,004

LIQUID CONTROLLED STRUCTURE

Orlando K. Owen, Jr., Terre Haute, Ind., assignor to The Dao Corporation, Terre Haute, Ind., a corporation Application April 30, 1941, Serial No. 391,132

15 Claims. (Cl. 47—1.2)

This invention relates to a nutrient liquid culture structure including one or more culture beds and each provided with a low head self-priming syphon arrangement for purging the liquid from a bed subject to a low head. The low head operable self-priming syphon per se is not restricted to nutrient liquid culture structures but may have many other uses and may be utilized whenever and wherever beds, tanks, troughs, or other containers under low heads are to be purged.

One chief object of the invention is to provide a nutrient liquid culture structure including one or more beds with means for rapidly purging the same after the bed has been sufficiently saturated and which purging means is normally or relatively inefficient during the bed filling period of the nutrient liquid supply thereto.

Another object of the invention is to provide a syphon arrangement operable upon relatively small heads and which is of self-priming character, so that a bed, tank, trough or other container having a low head of liquid therein can and automatically will prime the syphon as the aforesaid approaches complete filling so that the syphon requires no attention and is entirely automatic in its operation and when primed will quickly empty the bed, et cetera, of the nutrient liquid, or the like.

One feature of the invention includes supplying to one or more beds, successive beds being at successively lower elevations, periodically, a nutrient liquid, or the like, when the bed is utilized for liquid culture purposes, such liquid being supplied to the highest bed at the highest end for filling the same to the desired level and which bed when filled will automatically discharge to a sump or well when but one bed is utilized or to the next lower bed for filling same and the latter then automatically discharges when filled to a third bed, et cetera, or to the aforesaid sump or well. The nutrient liquid supply arrangement, if desired, is connected to the sump or well for closed cycle circulation of the nutrient liquid. It, of course, is to be understood that the nutrient chemicals, soluble in water, for example are supplied to the liquid in the well so that the desired concentration or strength of said nutrient liquid is maintained.

In one practical application, the same being illustrated herein in the drawing, the beds are approximately 100 ft. in length and two are shown connected in series. Each is about 3½ ft. wide and about 6 inches deep. The drawing does not illustrate a greenhouse or growth plot having a plurality of parallel series of series connected beds but in the practical greenhouse application of the invention, there are as many parallel rows of series connected beds as can be conveniently accommodated in that greenhouse.

The high beds of each series are or may be supplied simultaneously with nutrient liquid at predetermined times and for a predetermined period. That is all the operator's attention required except to supply additional water and nutrient chemicals in amounts necessary for make-up and replenishment purposes, respectively.

A single pump can, when of sufficient capacity, draw the nutrient liquid of proper strength from the well and supply such liquid, as aforesaid, simultaneously to the high bed of each series. Such pump will continue operation until manually stopped or until automatically stopped by an electric timing control which would be preferably associated with the power supply to the electric motor to cut off such power supply to said motor. An automatic time control can reestablish power supply to the motor periodically.

It has been ascertained that in a structure of the character hereinbefore set forth, that a filling period of about fifteen to twenty minutes is sufficient and that the liquid will be purged from said bed in about thirty to forty-five minutes. Liquid is supplied to each bed at predetermined intervals. It has been ascertained that when sunlight growth conditions are not conducive to luxuriant growth, three to four applications per day are satisfactory, whereas when sunlight growth conditions are conducive to luxuriant and rapid growth, the intervals between liquid supply must be reduced in amount and four to six bed immersions daily may be required.

It also has been ascertained that for different plants, the number of applications should be varied as well as the nutrient solution in such a manner that each plant grows properly. Preferably, the plants in the beds supplied from one tank are of like character and of the same general size or age, since the nutrient may be varied as plant growth progresses.

Another chief feature of the invention resides in the particular formation and construction of the low head, self-priming syphon arrangement.

Other objects and features of the invention will be set forth more fully hereinafter.

The full nature of the invention will be understood from the accompanying drawing and the following description and claims:

In the drawing, Fig. 1 is a diagrammatic side elevation of the invention as applied to two series connected culture beds in a closed system or cycle nutrient arrangement.

Fig. 2 is an end elevation of one of the beds and the syphon associated with the lower and discharge end thereof.

Fig. 3 is an enlarged longitudinal sectional view through the lower end of an upper bed, the self-priming syphon being shown in section and the other portions of the apparatus associated therewith being shown in section.

In the drawing 10 designates generally an upper bed, 11 a lower bed, 12 a trough therebetween and 13 a syphon between the lower end of the upper bed and the trough. The numeral 14 indicates a trough from the lowest bed, herein bed 11, to the storage tank or reservoir 15. The lowest bed also is provided with a syphon connection 16 with the trough 14. The numeral 17 indicates a conventionally illustrated pump having the suck or intake line 18 terminating near the bottom of the tank or reservoir 15. The pump has its discharge connected to the line 19. The pump may be driven by electric motor 120 supplied with current by conductors 121, the latter including a time control 122 and a manual control 123, if desired. The time control 122 may be omitted and only the manual control utilized. The time control 122 may be of such character it will initiate automatically motor operation, when the manual control 123 is closed, maintain motor energization for the predetermined interval, and then automatically interrupt the motor circuit, thereby stopping the pump and the liquid supply.

If desired, the control 122 may be of adjustable type socket and the duration of motor operation may be regulated as well as the idle interval between operations. For safety purposes, in this type of installation there should be included in the motor circuit, a manually operable switch, such as switch 123 so that the motor circuit may be opened at will whenever necessary or required.

Since each trough or bed is substantially identical to the other, or others, a description of one will suffice.

The bed includes a bottom portion 20 and two upwardly and outwardly inclined side walls 21 provided with flanges 21a. The bottom 20 is inclined from the sides toward the center, as shown, and in the lowest portion thereof is a slight groove 22. Positioned within the bed and immediately above the groove 22 is a liquid transmitting conduit formation, herein shown in the form of half tiles 23, positioned in butt joint relation, as shown in Fig. 1.

The line 19 extends downwardly as at 19a and includes a portion 19b which discharges into the conduit 23. The lower end of the culture bed 10 is provided with a well or pit arrangement, indicated by the numeral 24. Spaced from the lower end 25 of said pit arrangement and forming therewith the pit 24, is a screen box arrangement 26, which retains the aggregate in the bed and above the tile in said bed and prevents its passage or movement into the pit 24. The bottom 20 includes at its lower end a depressed portion 20a that leads to the sump 27 of the pit formation.

Extending through the wall 25 is a restricted communication structure in the form of a nipple 28 having its intake and upper end exposed to the pit 24 and its discharge or outlet end closed by a cap 29 including an aperture 30 therein. This aperture is positioned at the lowest point. The low level of the intake end of the communication 28 coincides with the pit low liquid level indicated by the numeral 31 in Fig. 3.

The aggregate may be gravel, sand, cinders, haydite, broken rock, etc., which contain no soluble constituents deleterious to plant growth. In the event same should initially contain soluble constituents desirable for plant growth, the liquid must have such equivalent chemicals added thereto to compensate for the initial loss or exhaustion. It is to be understood the nutrient supply (chemically) is very closely controlled for most efficient and economical growth purposes.

The trough structure referred to and designated as 12 in Fig. 1 at its upper end includes a pit 32, the liquid level of which never falls below that indicated by the line 33. Whenever the pump supplies liquid to the discharge 19b, nutrient liquid starts to flow through communication 28 and discharges at 30 into the trough structure 12 and this raises the liquid level in the pit 32 and said trough 12 to the level indicated by the line 34.

In Fig. 3 there is illustrated in detail one embodiment of the syphon arrangement. It will be noted that this includes a structure, which is in longitudinal section, a flattened tube, substantially arcuate in outline, and this portion is indicated by the numeral 35. The upstream end of this syphon arrangement includes the upstream directed offset portion 36 and the depending vertical portion 37 having the intake opening 38 at its lower end. This intake opening 38 lies above the pit low level 31. This offsetting 36 shown permits the syphon to be mounted properly, yet if necessary, clear a transverse conduit indicated by dotted lines in Fig. 3, and by the numeral 39. Whenever clearance is not necessary, this upstream offset 36 may be omitted in which event portion 37 is a vertical depending extension of the upstream end of the arcuate portion 35 and this simplified modification is equally efficient as the form illustrated herein.

The outer and down-stream end of the syphon structure is upstream and downwardly directed as indicated at 40 and depending therefrom is the depending vertical leg 41 having the outlet 42. Portions 37 and 41 are substantially parallel. Outlet 42 terminates just above the liquid level 34 in trough 12 which occurs when liquid is being supplied thereto through the aperture 30. It will be apparent—see Fig. 3—that the face 41a is offset rearwardly or upstream a greater amount than the position of the downstream end or wall 35a. This appears to be a critical relationship, as will be pointed out hereinafter. It will be understood that the top of the bed 11 at the upper end is approximately 1 inch below the bottom (at the center in the form illustrated) of bed 10 at the lower or downstream end thereof, so that gravity flow and drainage can occur even though the same be of the aforesaid restrictive character.

Since discharge 19b at the upper end of the upper bed supplies nutrient liquid to the bed and into the pit 24 faster than same can drain therefrom by way of port 30 to the pit 32 and trough 12, it will be apparent that the nutrient liquid level will gradually rise in the bed and the pit 24 and as it rises it will fill the bed until it reaches the level indicated by the line 43. During all this interval of filling, the only discharge is by way of restrictive communication or bypass 28—30.

When the liquid has risen in the upper bed to that indicated by the line designation 44, liquid begins to drain from the pit 24 by passing around through the syphon structure as indicated by the dotted line 45 in the portion 35. As the liquid level rises and more liquid continues to pass through the syphon it falls downwardly, as indicated at 46 impinging upon the lower portion of the wall 40 at 40a and then follows downwardly upon the opposite side or front wall of the syphon outlet leg, as illustrated by light dash lines in Fig. 3. The liquid level in trough 32 now rises to the level indicated at 49.

As this liquid continues to discharge by gravity over the arcuate portion of the syphon, it finally effects a seal between the points 35a and 40a and this then causes a small amount of the air then included in the syphon structure to pass outwardly through the discharge 42 and bubble upwardly in the trough 12. This action continues until a sufficient amount of air is exhausted, whereupon a positive liquid seal is effected and combined liquid flow through the syphon, and more particularly through the portion 41 thereof, sucks from said syphon the rest of the air trapped in the syphon. This condition is evidenced by quite an amount of noise or a most realistic belching noise. The gradual release of air, previously mentioned, has been designated as a "nicking" action while the final air discharge which occurs with a rush, has been termed a belch. When this occurs the syphon is fully primed for syphon operation and continues to operate and to rapidly exhaust the liquid in the upper bed 10 or purge the liquid therefrom.

In Fig. 3 the line designated by 47 represents the maximum height that the liquid attains in said bed prior to purging. It, of course, will be understood that purging continues until the syphon action is broken by air entering the syphon at 42, which will be hereinafter explained. When that occurs, the restrictive drain condition is the only discharge from the upper bed. Whatever liquid drains from the aggregate in that bed then collects in the pit 24 and is wasted slowly by bypass 28—30, to the trough 12.

It here is pointed out that the line 49 in Fig. 3 designates a liquid level in the trough, which is obtained as a result of the liquid passing through the syphon in the form of the film or sheet designated by 45 and 46 and when the aforesaid level is reached, the discharge end of the syphon structure is liquid sealed. The curtain seal 46 then becomes effective for the belching operation and subsequent purging of the upper bed structure. When purging occurs the dotted line 50 indicates the liquid level in the trough 12. It will be noted in Fig. 2 that the width of the syphon structure is substantially the width of the trough 12. It will also be noted the pit end 25 is notched as at 51 to permit of the mounting of the syphon structure so that its two ends or legs are positioned as shown in Fig. 1.

Briefly, the operation is as follows:

The liquid upon being supplied at 19a to the upper bed rapidly begins to rise therein and immediately starts to flow slowly out of the bypass opening 39, this bringing the level of the liquid in the trough to that indicated by the numeral 34. Since less liquid escapes than is supplied to the bed, the liquid, as stated, rises and when it reaches the level in the bed, indicated at 43, the liquid begins to flow over the high point 35c of the syphon 35. The intake end of the syphon is now water sealed. This liquid touches the interior of the syphon at the points 35a and 40a, respectively. This liquid sheet, as it were, between these two points and designated by the numeral 46, seals off the air pocket 35b in the syphon 35 from the discharge end. The level of the liquid in the trough 12 now rises to the level indicated by line 49 as the liquid flows out of the syphon at the point of discharge 42. During the rise of the liquid in the bed that portion of the liquid which continues to flow through the syphon, as indicated, begins to nick a little of the air out of the air pocket 35b. Finally the liquid reaches the level 47 in the bed. At this point the air in the syphon is forced out of the air pocket 35b due to the low head pressure as evidenced by the belch and the syphon then is primed fully. Continued flow of liquid through the syphon now raises the liquid level in the trough 12 to the point approximately indicated by the dotted line 50.

As the head of the liquid in the bed drops, incident to the discharge through the syphon, the liquid in the trough 12 thereupon falls back to the level 34. The liquid tension at the syphon discharge 42 becomes weaker. Air finally breaks through this liquid seal and enters the syphon from this discharge end and automatically breaks the seal. This breaking of the liquid seal, however, does not occur until the bed has been practically drained. The bypass 28—30 then drains the bed completely of any liquid that may have been slow in draining out of the aggregate included in the bed. At this time the liquid level stands in the trough pit 32 at level 33 and in the bed pit 24 level with the bottom of the outlet 28, see 31, with which the bypass outlet 30 is in free communication.

The bypassed and syphoned liquid discharged from the upper bed 10 is conveyed by trough 12 to bed 11 where the operation is repeated. The bypassed and syphoned liquid discharged from lower bed 11 is conveyed by trough 14 to container or well 15.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A nutrient liquid culture structure including a plurality of culture beds, each slightly lower than the bed ahead, means connecting adjacent beds for conveying liquid nutrient from the higher to the lower bed, means for receiving the nutrient material discharged by the lowest bed, means supplying nutrient material to the upper end of the highest bed and connected to the last mentioned means, the nutrient liquid flowing by gravity from the higher to the lower end of each bed, and low-head operable syphon means interposed between the low end of the upper bed and the first mentioned connecting means.

2. A structure as defined by claim 1, characterized by the addition of a restricted discharge between the lower and upper ends of the upper and lower adjacent beds and discharging to the first mentioned means.

3. A structure as defined by claim 1, characterized by the addition of a restricted discharge between the lower and upper ends of the upper and lower adjacent beds and discharging to the first mentioned means, the intake end of said restricted discharge being below the lowest liquid level of the upper bed, and the outlet end of the restricted discharge being above the uppermost liquid level of the adjacent lower bed.

4. A structure as defined by claim 1, characterized by the highest point of the syphon means being slightly below the highest liquid level of the low end of the upper bed.

5. A structure as defined by claim 1, characterized by the addition of a restricted discharge between the lower and upper ends of the upper and lower adjacent beds and discharging to the first mentioned means, and the highest point of the syphon means being slightly below the highest liquid level of the low end of the upper bed.

6. A structure as defined by claim 1, characterized by the addition of a restricted discharge between the lower and upper ends of the upper and lower adjacent beds and discharging to the first mentioned means, the intake end of said restricted discharge being below the lowest liquid level of the upper bed, the outlet end of the restricted discharge being above the uppermost liquid level of the adjacent lower bed, and the highest point of the syphon means being slightly below the highest liquid level of the low end of the upper bed.

7. A nutrient liquid culture bed structure including an elongated body portion, the bottom being slightly inclined toward a low point, a tile-like, liquid passing, conduit extending longitudinally of the body portion and positioned adjacent the bottom, means for supplying nutrient to the upper end of the body portion, aggregate in and substantially filling the body portion except for the conduit occupied volume thereof, a pit at the lower end of the body portion and having a low liquid level below that of the body portion bottom, an aggregate retaining, liquid passing wall between the pit and body portion, and means operatively associated with the pit for body portion drainage of the nutrient liquid after the bed has been substantially filled.

8. A structure as defined by claim 7, characterized by the addition of a second pit adjacent the first pit and said draining means including a low head operable self-priming syphon, the intake of which is above the first pit low level and the outlet of which is above the low level of the second pit, the height of the syphon being approximately that of the upper liquid level in the body portion.

9. A structure as defined by claim 7, characterized by the addition of a second pit adjacent the first pit, and said draining means including a low head operable self-priming syphon, the intake of which is above the first pit low level and the outlet of which is above the low level of the second pit, the height of the syphon being approximately that of the upper liquid level in the body portion, and a restricted communication between pits, the intake end of the communication being below the body portion bottom and the outlet end thereof being slightly above the low liquid level of the second pit and below the intake.

10. A self-priming-low-head operable syphon communication between two structures at different levels, and separated by an upwardly directed partition, the upper edge thereof determining the high liquid level in the upper structure, said partition including a restricted amount, free communication therethrough with an intake at a level near the low liquid level of the upper structure and a discharge above the low level of the lower structure, and a syphon having its intake above the communication intake level and its discharge below the communication discharge level but above the high level of the lower structure.

11. A self-priming-low-head operable syphon communication between two structures at different levels, and separated by an upwardly directed partition, the upper edge thereof determining the high liquid level in the upper structure, said partition including a restricted amount, free communication therethrough with an intake at a level near the low liquid level of the upper structure and a discharge above the low level of the lower structure, and a syphon having its intake above the communication intake level and its discharge below the communication discharge level but above the high level of the lower structure, and means in the syphon for effecting a liquid seal therein without requiring filling of the syphon.

12. A nutrient liquid culture structure including an elongated culture bed slightly pitched from its high to low end, aggregate drainably retained therein, a pit in free communication with bed and having a low level below that of the lowest level of the bed and a high level equal to that of the high liquid level of the low end of the bed, a nutrient reservoir at a level below the lowest level of the bed, and a low-head operable, self-priming syphon having its intake end in said pit above the low level thereof and its discharge end below the level of the intake end, the highest point of the syphon passage being slightly below the high liquid level of the pit for bed purging to the reservoir.

13. A structure as defined by claim 12, characterized by the addition of a materially restricted gravity flow bypass around the syphon for free discharge from the pit to the reservoir for complete drainage of the bed.

14. A nutrient liquid culture structure including an elongated culture bed slightly pitched from its high to low end, aggregate drainably retained therein, a pit in free communication with bed and having a low level below that of the lowest level of the bed and a high level equal to that of the high liquid level of the low end of the bed, a nutrient reservoir at a level below the lowest level of the bed, and a low-head operable, self-priming syphon having its intake end in said pit above the low level thereof and its discharge end below the level of the intake end, the highest point of the syphon passage being slightly below the high liquid level of the pit for bed purging to the reservoir, and a time controlled pump connected to the reservoir for supplying liquid therefrom to the upper end of the bed for a predetermined interval at least sufficient to insure substantially complete filling of the bed and pit.

15. A structure as defined by claim 14, characterized by the addition of a materially restricted gravity flow bypass around the syphon for free discharge from the pit to the reservoir for complete drainage of the bed.

ORLANDO K. OWEN, Jr.